Jan. 26, 1932.  K. KANNENBERG  1,842,675
MASK FOR WELDING AND LIKE OPERATIONS
Filed Sept. 27, 1930   2 Sheets-Sheet 2
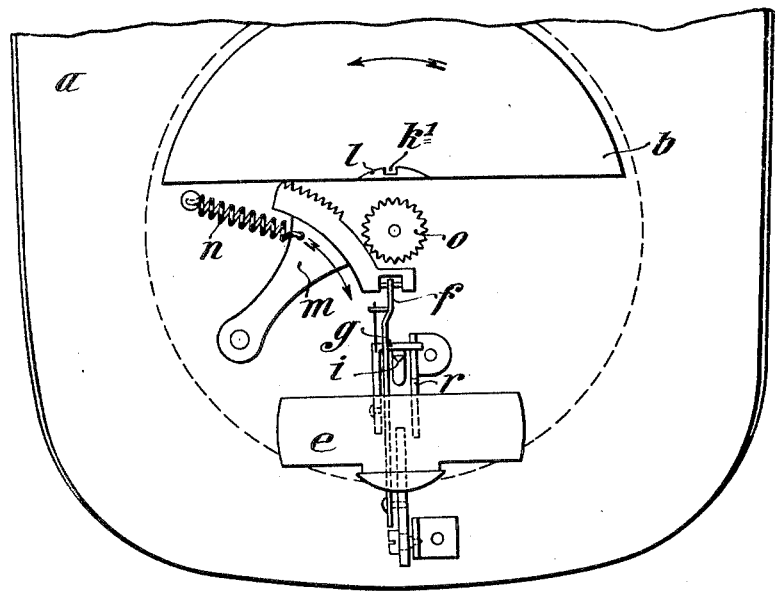
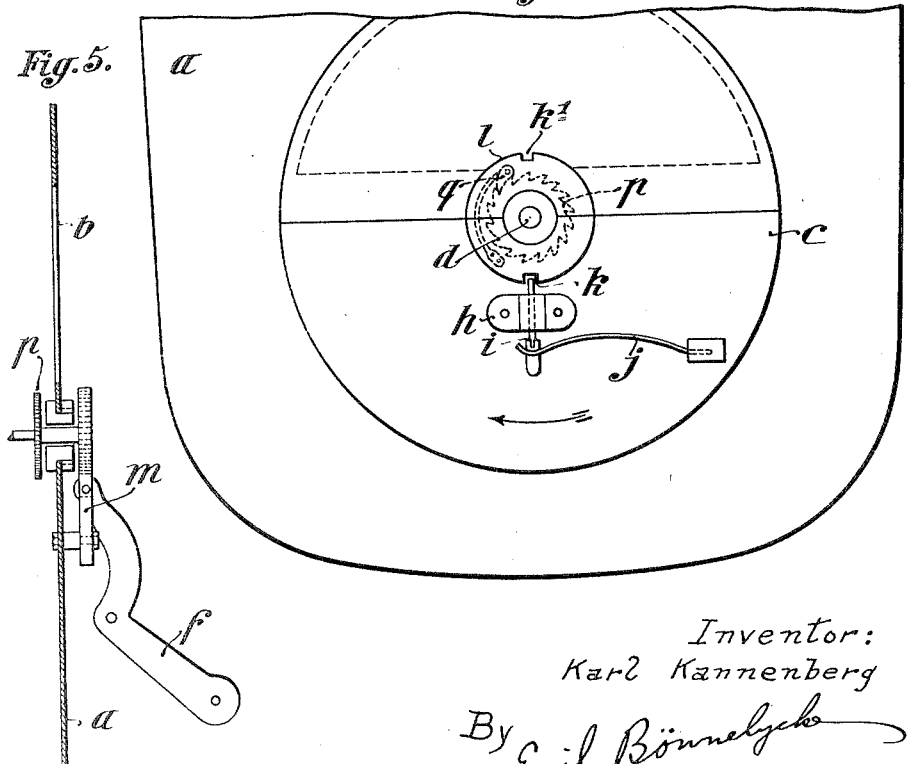
Inventor:
Karl Kannenberg
By Emil Bönnelycke
Attorney Patented Jan. 26, 1932

1,842,675

UNITED STATES PATENT OFFICE

KARL KANNENBERG, OF BERLIN, GERMANY

MASK FOR WELDING AND LIKE OPERATIONS

Application filed September 27, 1930, Serial No. 484,916, and in Germany July 22, 1929.

The present invention relates to a mask worn during the performance of welding and analogous operations, and more particularly to a mask having a rotary eye screen and adjustable head attachment means.

It is the primary object of the invention to provide a mask of this description which is extremely simple in its adjustment and which will present a minimum of inconvenience to the wearer.

Other objects and advantages obtained will become apparent as the description proceeds.

The necessity of employing a mask to protect the face and eyes against the effect of light and heat in certain branches of the metal trade, for example in such operations in which use is made of an electric arc or an oxyhydrogen flame, has become perfectly well known.

The desirability of inspecting the work, during brief interruptions in the particular operation being performed, without interposition of the colored dimming screen in general use has led to the construction of innumerable types of light-screen glasses and caps, in which the screen glasses are moved across or away from the field of view by folding the same back or displacing them in other suitable manner.

The essence of the present invention consists in the fact that on an axle or shaft mounted on the mask there is caused to rotate in front of the eyes of the wearer a multi-colored eye-screen, the rotation and setting of which may be performed without the assistance of the hands.

The invention will now be described more fully with reference to the accompanying drawings, in which Fig. 1 is a side view of the complete mask with the adjustable head attachment, shown in part in longitudinal section.

Figs. 3 and 4 show the operating and fixing means for the screen, seen from the inside and outside respectively.

Fig. 5 is a cross-sectional view of a portion of the mask.

Figure 1:
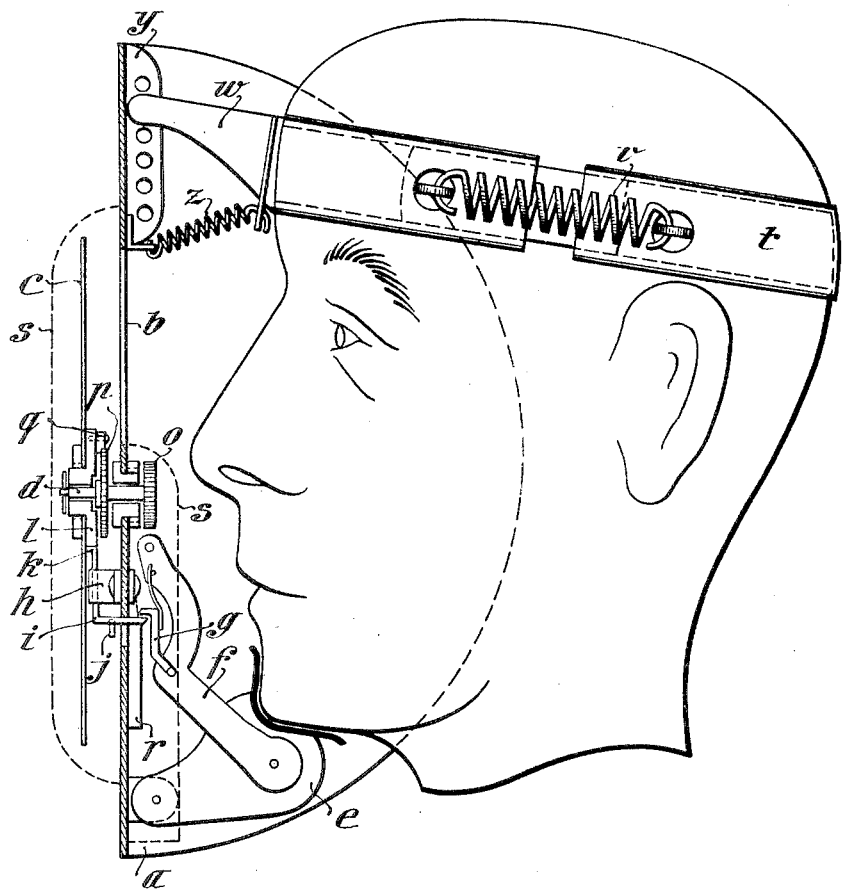
Figure 2:
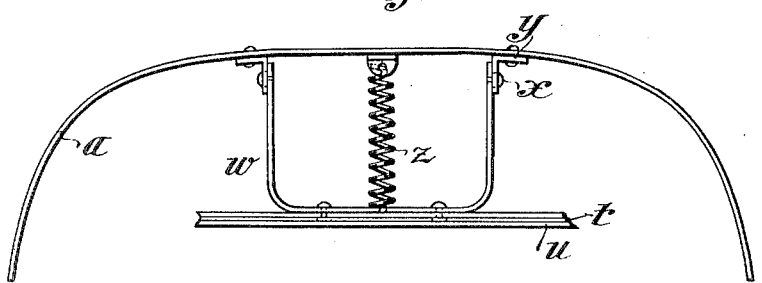
Fig. 2 shows the adjustment means for the head attachment viewed from the top.

For the purpose of a more ready and comprehensive disclosure of the general arrangement the toothed sector $m$ with the appertaining spring $n$ have been omitted from Fig. 1.

The mask $a$, which in its general form is approximately adapted to the form of the face, possesses as an essential constituent, in front of the view aperture $b$, a multi-color screen $c$, which is rotary at its centre point about a shaft or axle $d$.

By the downward movement of the chin lever $e$ the rod $f$ is also moved in the same direction. The angular member $g$, which is mounted in resilient fashion to be rotary on the rod $f$ engages the bolt $i$ mounted in the block $h$ and withdraws the same from the catch $r$ in the circular locking disc $l$, which is firmly connected with the screen.

In this manner the screen is released to perform a rotary movement.

In the meantime, by reason of the additional movement of the rod $f$, the toothed sector $m$ pivotally connected therewith has, overcoming the pull of the spring $n$, been moved to such extent in the direction of the arrow that the teeth of the sector have engaged with those of the wheel $o$, the latter accordingly rotating anti-clockwise.

Since both the wheel $o$ as well as the toothed rim $p$ are firmly connected with the axle $d$ the rotary motion, by reason of engagement of the small pawl $q$ in the rim $p$, is also transmitted to the screen $c$—in the direction of the arrow.

After rotation of the screen to the extent of roughly 30° the catch $r$, owing to additional downward movement on the part of the rod $f$, displaces the angular member $g$ to such extent towards the inside that the same again releases the bolt $i$ which, under the action of the bolt spring $j$, is moved upwards and thrusts against the curved portion of the locking disc $l$, to spring upon completion of the rotation of the screen to the extent of 180° into the catch $k^1$ and thus prevent the screen from rotation further.

When the downward pressure on the chin lever $e$ ceases, the sector spring $n$ again returns the whole operating mechanism into the initial position.

The toothed rim $p$ moves freely past the pawl *q* in a counterclockwise direction, and the angular member *g* slides over the bevelled portion of the bolt *i* back into the position of rest shown in Fig. 1.

The mechanism is now in a position of readiness for renewed actuation.

The complete operation of the screen, including the positively performed release and relocking action, occurs solely as a result of the downward movement of the chin lever; this alone constitutes the actual operation, while the upward movement represents merely the return of the operating and locking members into the initial position with the screen remaining in stationary position.

In the particular embodiment according to the drawings the screen is shown to possess two colors, so that accordingly there are also provided two catches in the disc *l*, which are situated opposite to each other. The screen, however, may also be provided with three or more colors, in which case the catches are provided in number corresponding thereto.

The dotted lines *s* in Fig. 1 represents guard caps having the object of protecting the operating mechanism against exterior influences.

The head attachment for the mask consists of a two-part head ring *t* composed of a flexible metal tape or band furnished with a padding *u*.

Adaptation to the form of the head is obtained by two tension springs *v* provided approximately in the vicinity of the temples.

On the inner side the metal band carries a U-shaped resilient member *w* furnished laterally at the two tapered ends with small round buttons *x*.

These buttons are capable of being moved into rotary engagement with the apertures or recesses of two bars *y* mounted vertically on the inner side of the mask parallel to each other.

This device, which permits of rapid manipulation, enables the head attachment to be adjusted as regards height, so that the mask may be exactly adjusted to the particular size of head.

The lower edge of the metal band is connected with the wall of the mask by means of a tension spring *z*. In this manner the mask is also caused to fit snugly against the lower part of the face, and any possible withdrawal of the mask from the face of the wearer when the head is bent downwards is also reliably prevented.

It will be understood that no restriction is made to the specific form of embodiment shown in the drawings, which has been furnished merely by way of example, and that various modifications are quite possible within the meaning of the above description and the annexed claims without departing from the spirit of the invention.

What I claim as new and desire to secure by Letters Patent is:

1. In a mask of the kind described, a shield-like plate composed of insulating material and open on all sides, an attachment ring holding the said plate at a distance from the face, an adjustable screen for protecting the eyes, a mechanism for adjusting the said screen causing the same to be unlocked, rotated and relocked in the fresh position, and a lever for causing the actuation of the said mechanism, the said lever being actuated by downward movement of the chin.

2. In a mask of the kind described, a shield-like plate composed of insulating material and open on all sides, an attachment ring holding the said plate at a distance from the face, an adjustable screen for protecting the eyes, a mechanism for adjusting the said screen causing the same to be unlocked, rotated and relocked in the fresh position and after the latter operation to be returned automatically into the initial position, and a lever for causing the initial actuation of the said mechanism, the said lever being actuated by downward movement of the chin.

3. In a mask of the kind described, a shield-like plate composed of insulating material and open on all sides, an attachment ring holding the said plate at a distance from the face, an adjustable screen for protecting the eyes, a mechanism for adjusting the said screen causing the same to be unlocked, rotated and relocked in the fresh position and after the latter operation to be returned automatically into the initial position, and a lever for causing the initial actuation of the said mechanism by depression of the said lever by a short abrupt movement of the chin of the wearer.

4. In a mask of the kind described, a shield-like plate composed of insulating material and open on all sides, an attachment ring holding the said plate at a distance from the face, a resilient U-member secured with the bridge thereof to the said ring, lateral studs on the arms of the said U-member adapted to engage with adjustment recesses in a part on the said plate for adjusting the mask as regards height, an adjustable screen for protecting the eyes, a mechanism for adjusting the said screen, and means for actuating the said mechanism by facial movement without the assistance of the hands.

5. In a mask of the kind described, a shield-like plate composed of insulating material and open on all sides, an attachment ring holding the said plate at a distance from the face, means for adapting the said plate to fit the face of the wearer, an adjustable multi-colored screen for protecting the eyes, a mechanism for adjusting the said screen substantially in the manner described causing the same to be unlocked, rotated and relocked in the fresh position and after the latter operation to be returned automatically into the initial position, and means for actuating the said mechanism by facial movement without the assistance of the hands.

6. In a form of embodiment of a mask for welding and like operations, a shield-like plate constituting the mask proper, an attachment ring in a plurality of parts for holding the said plate at a distance from the face, tension springs connecting the said parts of the ring, a tension spring between the said ring and the said mask for causing the said mask to fit snugly against the lower part of the face, an adjustable screen for protecting the eyes having a colored section and a clear section permitting of unobstructed view of the work, a mechanism for passing the said sections as required before the eyes causing the said screen to be unlocked, rotated and relocked and after the latter operation to be returned automatically into the initial position substantially as described, and a lever for actuating the said mechanism by facial movement without the assistance of the hands.

7. In a form of embodiment of a mask for welding and like operations, a shield-like plate constituting the mask proper, a two-part attachment ring for holding the said mask at a distance from the face, tension springs connecting the two parts of the ring enabling adaptation of the said ring to the head of the wearer, a tension spring between the said ring and the said mask for causing the said mask to fit snugly against the lower part of the face, an adjustable multi-colored screen for protecting the eyes, a resilient U-member secured with the bridge thereof to the said ring, lateral studs on the arms of the said U-member adapted to engage with adjustment recesses in a part of the said mask for adjusting the said screen in its elevated position to the eyes of the wearer, a mechanism substantially as described for adjusting the said screen causing the same to be unlocked, rotated and relocked and after the latter operation to be returned automatically into the initial position, and a lever for actuating the said mechanism by downward movement of the chin of the wearer.

8. A protective mask particularly for welding and like purposes, comprising a shield-like plate composed of insulating material and open on all sides, an attachment ring holding the said plate at a distance from the face, an adjustable screen having a section for protecting the eyes and a clear vision section, and means operable by the jaw of the wearer for intermittently rotating the said screen to bring the desired section before the eyes of the wearer and for locking the screen in the respective positions.

9. A protecting mask particularly for welding and like purposes, comprising a shield-like plate, a screen rotatably mounted on said plate and having a section for protecting the eyes and a clear vision section, and means operable by the jaw of the wearer for intermittently rotating the screen to bring the sections into position before the eyes of the wearer and for locking the screen in the respective positions.

In testimony whereof I have affixed my signature.

KARL KANNENBERG.